US012301048B2

(12) United States Patent
Zhou et al.

(10) Patent No.: US 12,301,048 B2
(45) Date of Patent: May 13, 2025

(54) ENERGY STORAGE DEVICE AND ENERGY STORAGE POWER STATION

(71) Applicant: Sungrow Energy Storage Technology Co., Ltd., Hefei (CN)

(72) Inventors: Meng Zhou, Hefei (CN); Huadong Li, Hefei (CN); Wei Zhang, Hefei (CN)

(73) Assignee: Sungrow Energy Storage Technology Co., Ltd., Hefei (CN)

( * ) Notice: Subject to any disclaimer, the term of this patent is extended or adjusted under 35 U.S.C. 154(b) by 14 days.

(21) Appl. No.: 18/350,086

(22) Filed: Jul. 11, 2023

(65) Prior Publication Data

US 2024/0072568 A1    Feb. 29, 2024

(30) Foreign Application Priority Data

Aug. 29, 2022   (CN) .......................... 202222286161.4

(51) Int. Cl.
| | |
|---|---|
| *H01M 50/204* | (2021.01) |
| *H01M 50/244* | (2021.01) |
| *H01M 50/251* | (2021.01) |
| *H02B 1/30* | (2006.01) |
| *H02J 9/06* | (2006.01) |

(52) U.S. Cl.
CPC .......... *H02J 9/061* (2013.01); *H01M 50/204* (2021.01); *H01M 50/244* (2021.01); *H01M 50/251* (2021.01); *H02B 1/30* (2013.01); *H02J 9/068* (2020.01)

(58) Field of Classification Search
CPC ............. H01M 50/204; H01M 50/244; H01M 50/251; H02B 1/26; H02B 1/30; H02B 1/308; H02J 9/061; H02J 9/068
See application file for complete search history.

(56) References Cited

U.S. PATENT DOCUMENTS

| | | | |
|---|---|---|---|
| 2018/0337385 A1 | 11/2018 | Schnakofsky | |
| 2019/0237821 A1* | 8/2019 | Lo ....................... | H01M 10/443 |
| 2022/0059896 A1 | 2/2022 | Pan et al. | |

FOREIGN PATENT DOCUMENTS

| | | |
|---|---|---|
| CN | 208 674 327 U | 3/2019 |
| CN | 217 086 767 U | 7/2022 |
| EP | 3 958 373 A1 | 2/2022 |
| WO | WO 2018/213434 A1 | 11/2018 |

OTHER PUBLICATIONS

Extended European Search Report dated Jan. 22, 2024 in connection with European Application No. 23186840.7.

* cited by examiner

*Primary Examiner* — Levi Gannon

(74) *Attorney, Agent, or Firm* — Wolf, Greenfield & Sacks, P.C.

(57) ABSTRACT

An energy storage device and an energy storage power station are provided. The energy storage device includes an energy storage cabinet and a supplementary unit. A supplementary mounting position is provided on an outer side of a cabinet body of the energy storage cabinet, and the supplementary unit is arranged outside the cabinet body and at the supplementary mounting position. The energy storage cabinet is operable separately, and the energy storage cabinet is operable in conjunction with the supplementary unit for the energy storage device to supplement electric power to an energy storage power station.

17 Claims, 5 Drawing Sheets

ENERGY STORAGE DEVICE AND ENERGY STORAGE POWER STATION

The present application claims priority to Chinese Patent Application No. 202222286161.4, titled "ENERGY STORAGE DEVICE AND ENERGY STORAGE POWER STATION", filed on Aug. 29, 2022 with the China National Intellectual Property Administration, which is incorporated herein by reference in its entirety.

FIELD

The present application relates to the technical field of energy storage, and in particular to an energy storage device and an energy storage power station.

BACKGROUND

During the operation of the conventional energy storage power station, the loss of electric power of an energy storage system is inevitable, and a supplementary cabinet needs to be added year by year to maintain the stability of electric power.

With the increasing demand for industrial and commercial energy storage, industrial and commercial energy storage cabinets are developing rapidly. However, the industrial and commercial energy storage cabinets cannot be used as the supplementary cabinet, that is, the industrial and commercial energy storage cabinets cannot supplement electric power to the energy storage power station. In this way, the industrial and commercial energy storage cabinets are limited in terms of use. Moreover, the supplementary cabinet cannot be used as an energy storage cabinet.

In summary, how to design an energy storage device which has the functions of energy storage and supplementing electric power to the energy storage power station has attracted attention of those skilled in the art.

SUMMARY

In view of this, an object of the present application is to provide an energy storage device, which has the functions of energy storage and supplementing electric power to an energy storage power station. Another object of the present application is to provide an energy storage power station including the energy storage device.

In order to achieve the above objects, the following technical solutions are provided according to the present application.

An energy storage device includes an energy storage cabinet and a supplementary unit.

A supplementary mounting position is provided on an outer side of a cabinet body of the energy storage cabinet, and the supplementary unit is arranged outside the cabinet body and at the supplementary mounting position.

The energy storage cabinet is operable separately, and the energy storage cabinet is operable in conjunction with the supplementary unit for the energy storage device to supplement electric power to an energy storage power station.

In an embodiment, the energy storage cabinet includes a battery cluster and a switch control unit which are arranged in the cabinet body.

The switch control unit is configured to control the battery cluster to store energy and control the battery cluster to supplement electric power to the energy storage power station.

In an embodiment, in a case that the energy storage device is configured for energy storage, the battery cluster is connected with the switch control unit, and the switch control unit is configured to be connected with an energy storage converter; and in a case that the energy storage device is configured to supplement electric power to the energy storage power station, the battery cluster, the supplementary unit and the switch control unit are connected in a listed sequence, and the switch control unit is configured to be connected with a power station energy storage converter.

In an embodiment, the cabinet body is provided with a threading structure, and the threading structure is used for an output wire of the switch control unit to thread out of the cabinet body and for an input wire and an output wire of the supplementary unit to thread into the cabinet body.

In an embodiment, the threading structure includes two threading plates namely a first threading plate and a second threading plate.

In a case that the energy storage device is configured for energy storage, the first threading plate is detachably arranged on the cabinet body and is used for the output wire of the switch control unit to thread out of the cabinet body; and In a case that the energy storage device is configured to supplement electric power to the energy storage power station, the second threading plate is detachably arranged on the cabinet body, and is used for the output wire of the switch control unit to thread out of the cabinet body and for the input wire and the output wire of the supplementary unit to thread into the cabinet body.

Or, the threading structure includes a threading hole and a threading plate, the threading hole is used for the output wire of the switch control unit to thread out of the cabinet body, and the threading plate is used for the input wire and the output wire of the supplementary unit to thread into the cabinet body.

In an embodiment, the supplementary mounting position and the threading plate are arranged on a same cabinet board of the cabinet body.

In an embodiment, the supplementary unit is arranged on a side, proximate to the switch control unit, of the cabinet body.

In an embodiment, the supplementary unit is arranged on a side, adjacent to a cabinet door, of the cabinet body; or, the supplementary unit is arranged on a side, away from a cabinet door, of the cabinet body; or, the supplementary unit is arranged at a top of the cabinet body.

In an embodiment, the supplementary unit includes a fixed bracket and a supplementary device, the fixed bracket is fixed at the supplementary mounting position, and the supplementary device is fixed to the fixed bracket.

In an embodiment, the fixed bracket is detachably fixed at the supplementary mounting position, and/or, the supplementary device is detachably fixed to the fixed bracket.

Based on the above energy storage device, an energy storage power station is further provided according to the present application. The energy storage power station includes a power station energy storage converter, at least one power station energy storage cabinet and the energy storage device according to any one of the above embodiments.

The number of the energy storage device is at least one, and the power station energy storage cabinet and the at least one energy storage device are connected in parallel to the power station energy storage converter.

In the energy storage device according to the present application, by providing the supplementary unit outside the energy storage cabinet, the energy storage device has the function of energy storage if the energy storage cabinet is operated separately, and the energy storage device is capable of supplementing electric power to the energy storage power station if the energy storage cabinet is operated in conjunction with the supplementary unit, and thus the energy storage device has the function of supplementing electric power to the energy storage power station. Therefore, the energy storage device has the functions of energy storage and supplementing electric power to the energy storage power station, which expands the functions of the energy storage cabinet. It is not required to provide a separate supplementary cabinet for the energy storage power station, which improves the flexibility of use.

BRIEF DESCRIPTION OF THE DRAWINGS

For more clearly illustrating the technical solutions in the embodiments of the present application or in the conventional technology, the accompanying drawings used in the description of the embodiments or the conventional technology will be briefly described hereinafter. Apparently, the accompanying drawings described hereafter illustrate only embodiments of the present application, and other drawings can be obtained by those skilled in the art based on the drawings without any creative efforts.

Figure 1:
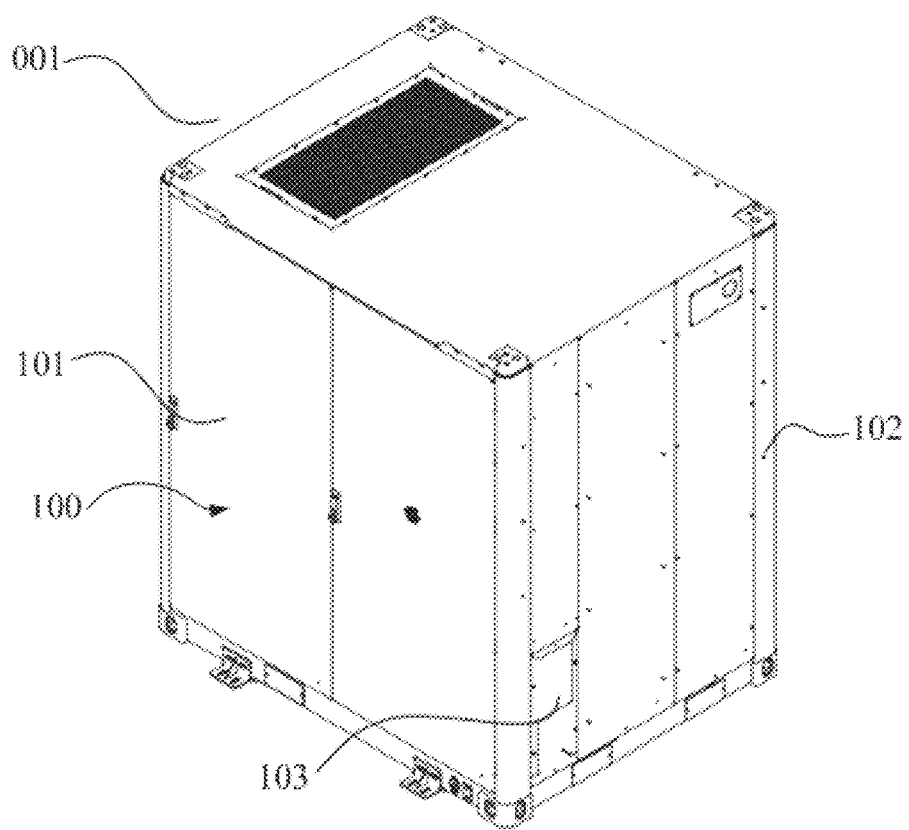
FIG. 1 is a schematic structural view of an energy storage cabinet in an energy storage device according to an embodiment of the present application.

Reference numerals in FIGS. 1 to 5 are listed as follows:

| | |
|---|---|
| 001 energy storage cabinet, | 002 energy storage device, |
| 003 energy storage converter, | 004 energy storage power station, |
| 005 power station energy storage cabinet, | 006 power station energy storage converter, |
| 100 cabinet body, | 101 cabinet door, |
| 102 supplementary mounting position, | 103 threading plate, |
| 104 threading hole, | 200 supplementary unit, |
| 201 fixed bracket, | 202 supplementary device, |
| 300 battery cluster, | 400 switch control unit. |

DETAILED DESCRIPTION OF THE EMBODIMENTS

The technical solutions in the embodiments of the present application will be described clearly and completely hereinafter in conjunction with the drawings in the embodiments of the present application. It is apparent that the described embodiments are only a part of the embodiments according to the present application, rather than all of the embodiments. Based on the embodiments in the present application, all of other embodiments, made by those skilled in the art without any creative efforts, fall into the scope of protection of the present application.

Figure 2:
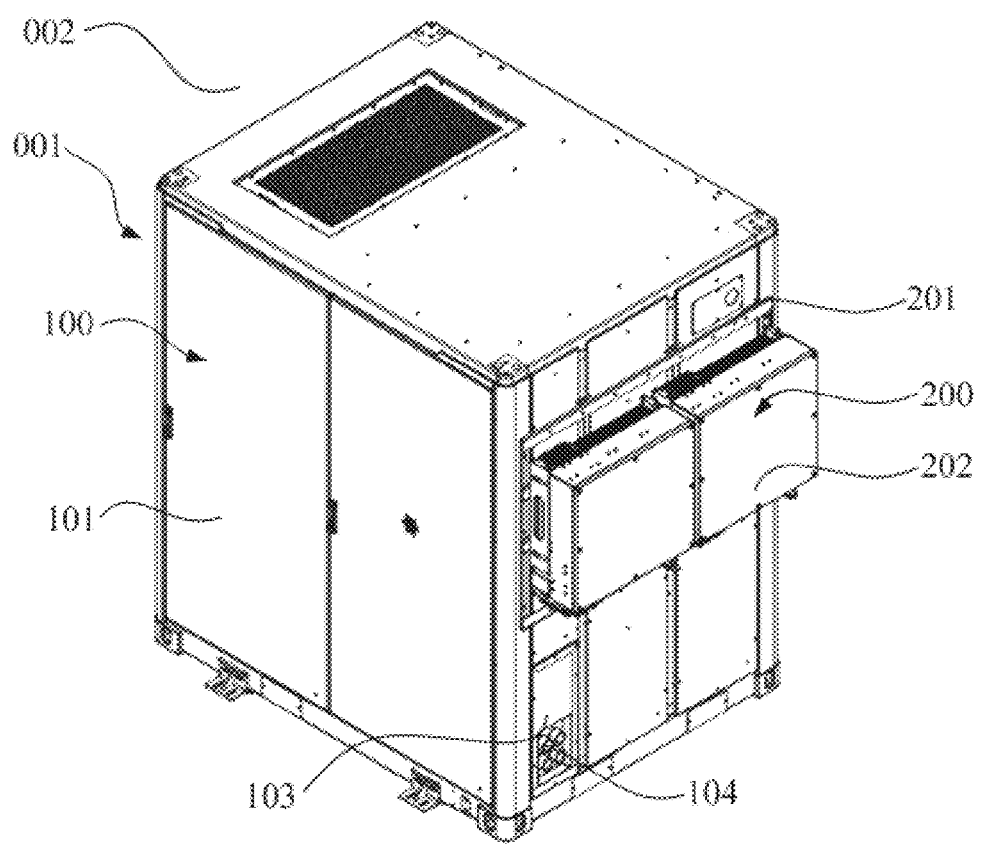
FIG. 2 is a schematic structural view of the energy storage device according to an embodiment of the present application.

As shown in FIG. 2, an energy storage device 002 according to an embodiment includes an energy storage cabinet 001 and a supplementary unit 200.

As shown in FIG. 1 and FIG. 2, a supplementary mounting position 102 is provided on an outer side of a cabinet body 100 of the energy storage cabinet 001, and the supplementary unit 200 is arranged outside the cabinet body 100 and at the supplementary mounting position 102.

In the energy storage device 002, the energy storage cabinet 001 is operable separately, and the energy storage cabinet 001 is operable in conjunction with the supplementary unit 200 for the energy storage device 002 to supplement electric power to an energy storage power station 004.

It should be noted that, when the energy storage cabinet 001 is operated separately, the supplementary unit 200 is not operated.

In a case that the energy storage cabinet 001 is operated separately, two or more energy storage cabinets 001 can be used in parallel connection. In a case that the energy storage cabinet 001 is operated in conjunction with the supplementary unit 200, two or more energy storage devices 002 can be used in parallel connection.

In the energy storage device 002, the energy storage device 002 has the function of energy storage if the energy storage cabinet 001 is operated separately, and the energy storage device 002 is capable of supplementing electric power to the energy storage power station 004 if the energy storage cabinet 001 is operated in conjunction with the supplementary unit 200, and thus the energy storage device 002 has the function of supplementing electric power to the energy storage power station 004. Therefore, the energy storage device 002 has the functions of energy storage and supplementing electric power to the energy storage power station 004, which expands the functions of the energy storage cabinet 001. It is not required to provide a separate supplementary cabinet for the energy storage power station 004, which improves the flexibility of use.

Figure 3:
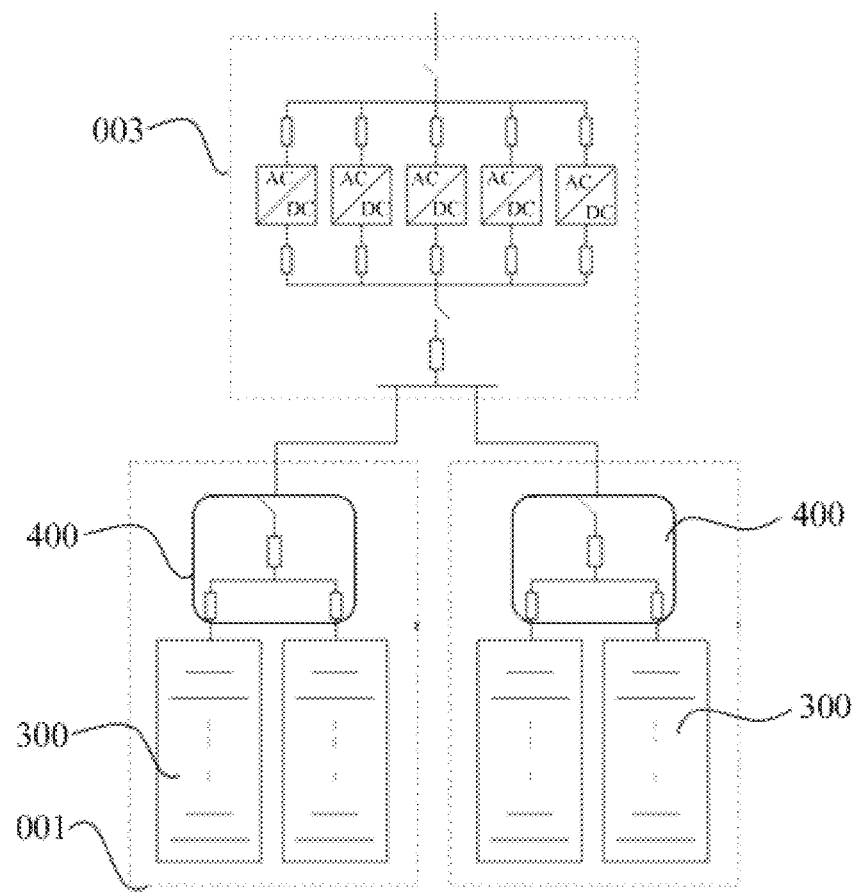
FIG. 3 is a schematic view illustrating a case that the energy storage cabinet in the energy storage device is operated separately according to an embodiment of the present application.

The specific structure of the energy storage cabinet 001 may be selected according to actual needs. In a specific embodiment, as shown in FIG. 3, the energy storage cabinet 001 includes a battery cluster 300 and a switch control unit 400. The switch control unit 400 is configured to control the battery cluster 300 to store energy and control the battery cluster 300 to supplement electric power to the energy storage power station 004. It should be noted that the battery cluster 300 and the switch control unit 400 are arranged in the cabinet body 100.

In the above embodiments, in a case that the energy storage cabinet 001 is operated separately, that is, in a case that the energy storage device 002 is configured for energy storage, the battery cluster 300 is connected with the switch control unit 400, and the switch control unit 400 is configured to be connected with an energy storage converter 003, as shown in FIG. 3.

In a case that the energy storage device 002 is configured for energy storage, two or more energy storage cabinets 001 may be connected in parallel, and the two or more energy storage cabinets 001 are connected in parallel to the same energy storage converter 003. Specifically, as shown in FIG. 3, the number of the energy storage cabinet 001 is two, and the two energy storage cabinets 001 are connected in parallel. Specifically, the two energy storage cabinets 001 are connected in parallel to the same energy storage converter 003.

Figure 4:
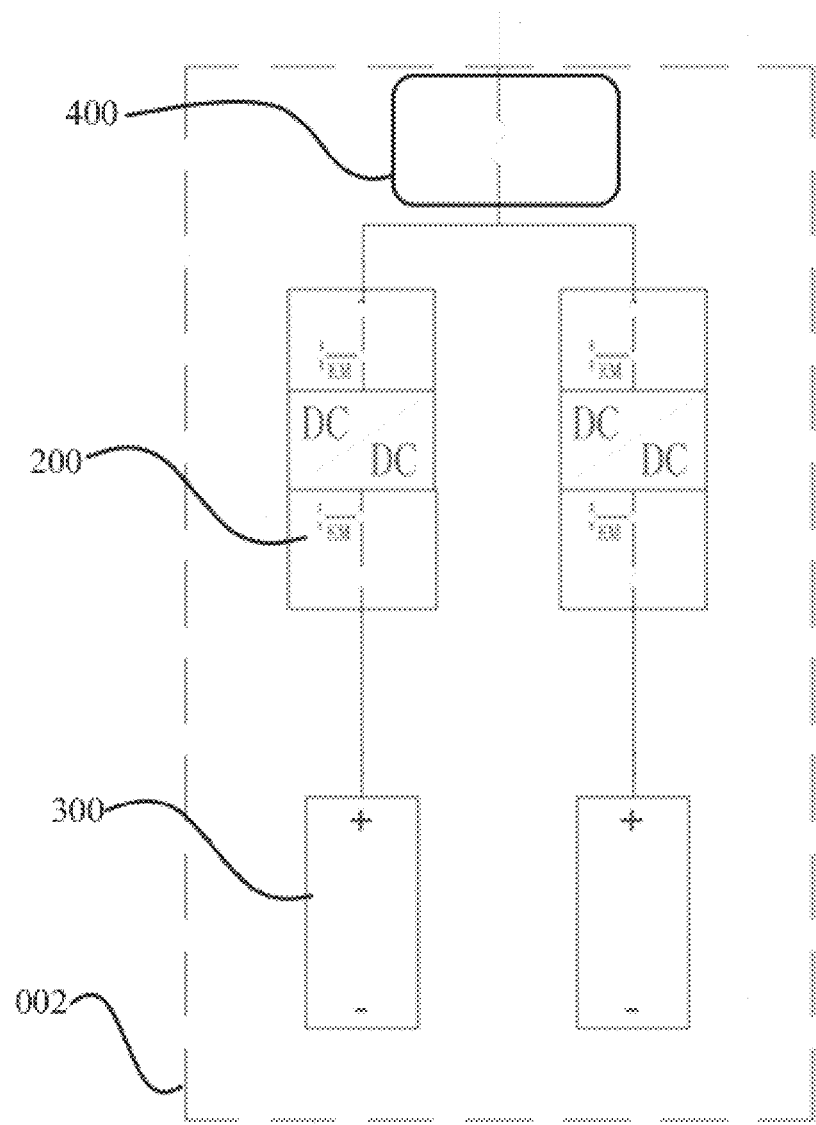
FIG. 4 is a schematic view illustrating a case that the energy storage device supplements electric power to an energy storage power station according to an embodiment of the present application.

In the above embodiments, in a case that the energy storage cabinet 001 is operated in conjunction with the supplementary unit 200, that is, in a case that the energy storage device 002 is configured to supplement electric power to the energy storage power station 004, in one aspect, the battery cluster 300, the supplementary unit 200 and the switch control unit 400 may be connected in a listed sequence, as shown in FIG. 4. It can be understood that if the energy storage cabinet 001 is operated in conjunction with the supplementary unit 200, the switch control unit 400 is configured to be connected with a power station energy storage converter 006.

In another aspect, the battery cluster 300, the switch control unit 400 and the supplementary unit 200 may be connected in a listed sequence, and the supplementary unit 200 is configured to be connected with a power station energy storage converter 006. In this way, the switch control unit 400 cannot control the supplementary unit 200, resulting in poor safety and reliability.

Therefore, by comparing the above two aspects, if the energy storage device 002 is configured to supplement electric power to the energy storage power station 004, the battery cluster 300, the supplementary unit 200 and the switch control unit 400 are preferably connected in the listed sequence, and the switch control unit 400 is configured to be connected with the power station energy storage converter 006. In this way, the safety and the reliability can be improved, and it can be ensured that the energy storage device 002, whether being configured for energy storage or supplementing electric power, is output by an output wire of the switch control unit 400, which is convenient to switch the function of the energy storage device 002.

Figure 5:
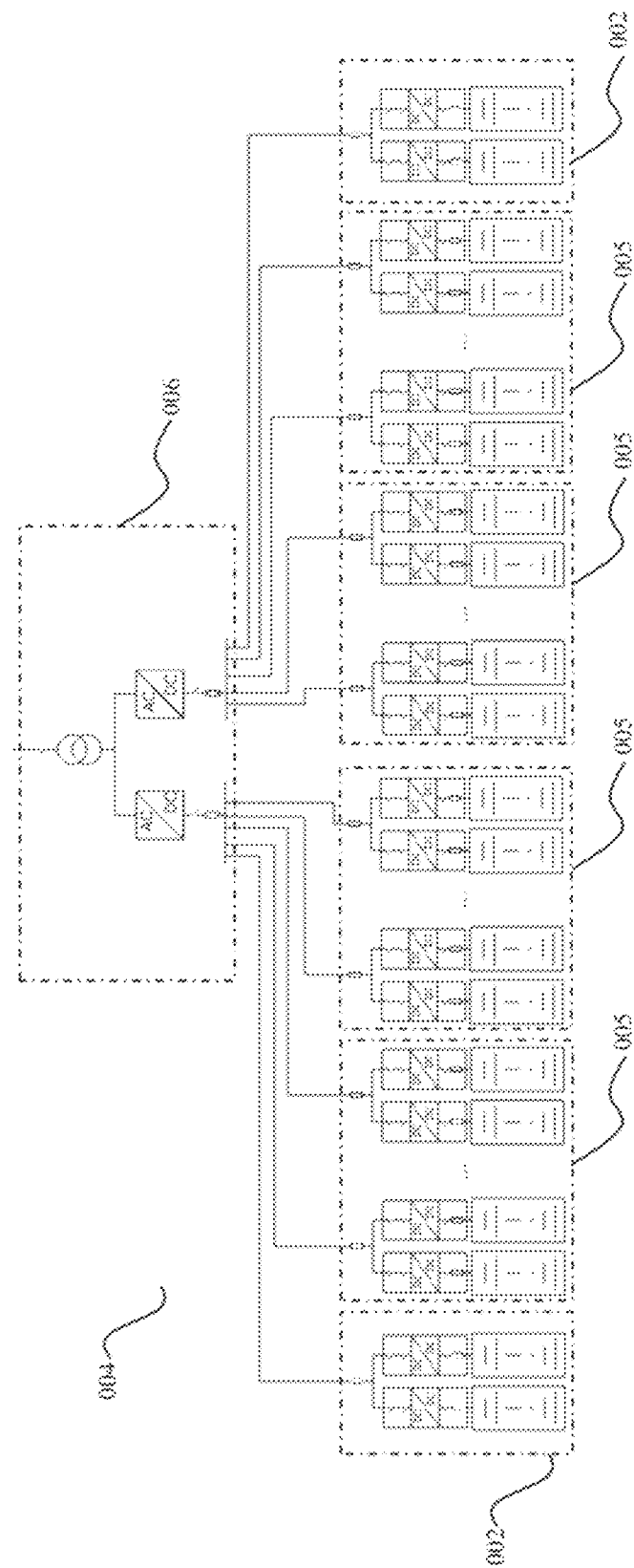
FIG. 5 is a schematic structural view of the energy storage power station according to an embodiment of the present application.

If the energy storage device 002 is configured to supplement electric power to the energy storage power station 004, two or more energy storage devices 002 may be connected in parallel, and the two or more energy storage devices 002 are connected in parallel to the same power station energy storage converter 006. As shown in FIG. 5, the number of the energy storage device 002 is two, and the two energy storage devices 002 are used with being connected in parallel and are connected in parallel to the same power station energy storage converter 006.

Based on the above connection structure, in order to facilitate wiring, the cabinet body 100 is provided with a threading structure for an output wire of the switch control unit 400 to thread out of the cabinet body 100 and for an input wire and an output wire of the supplementary unit 200 to thread into the cabinet body 100. In this way, wire connections are ensured to be located in the cabinet body 100, which improves the performance of protection.

Specifically, the threading structure is located at a bottom end of the supplementary mounting position 102.

In a specific embodiment, the threading structure includes two threading plates 103, namely a first threading plate and a second threading plate. In a case that the energy storage device 002 is configured for energy storage, the first threading plate is detachably arranged on the cabinet body 100 and is used for the output wire of the switch control unit 400 to thread out of the cabinet body 100. It can be understood that, the threading plate 103 shown in FIG. 1 is the first threading plate. In a case that the energy storage device 002 is configured to supplement electric power to the energy storage power station 004, the second threading plate is detachably arranged on the cabinet body 100 and is used for the output wire of the switch control unit 400 to thread out of the cabinet body 100 and for the input wire and the output wire of the supplementary unit 200 to thread into the cabinet body 100.

It should be noted that, the number of a wire-passing hole of the first threading plate and the number of a wire-passing hole of the second threading plate are different, and the sizes of the wire-passing holes may be different. The first threading plate and the second threading plate are not arranged on the cabinet body 100 at the same time. Specifically, the first threading plate or the second threading plate is selected to be mounted according to the use of the energy storage device 002. The output wire of the switch control unit 400 is configured to be connected with the energy storage converter 003 or the power station energy storage converter 006, the input wire of the supplementary unit 200 is connected with the output wire of the battery cluster 300, and the output wire of the supplementary unit 200 is connected with the input wire of the switch control unit 400.

In a specific embodiment, as shown in FIG. 2, the threading structure includes a threading hole 104 and a threading plate 103, the threading hole 104 is used for the output wire of the switch control unit 400 to thread out of the cabinet body 100, and the threading plate 103 is used for the input wire and the output wire of the supplementary unit 200 to thread into the cabinet body 100.

In the threading structure, in a case that the energy storage device 002 is configured for energy storage, the wire does not pass through the threading plate 103. In a case that the energy storage device 002 is configured to supplement electric power to the energy storage power station 004, the wire passes through the threading plate 103. In this way, there is no need to replace the threading plate 103, which simplifies the function switching of the energy storage device 002.

Since the switch control unit 400 generally needs to be connected with a reserved line on the ground, the threading hole 104 may be lower than the threading plate 103, so as to shorten a line path.

In another specific embodiment, the threading structure may include only one threading plate, the threading plate is used for the output wire of the switch control unit 400 to thread out of the cabinet body 100, and for the input wire and the output wire of the supplementary unit 200 to thread into the cabinet body 100, which is not limited to the above two embodiments.

Based on the above wiring manner, the supplementary mounting position 102 and the threading plate 103 are arranged on a same cabinet board of the cabinet body 100, so as to facilitate wiring.

Further, the cabinet board is adjacent to the cabinet door 101 of the cabinet body 100, which can realize the back-to-back arrangement of cabinet bodies 100, that is, a back side of one cabinet body 100 is arranged adjacent to a back side of another cabinet body 100. The back side of the cabinet body 100 is a side, away from the cabinet door 101, of the cabinet body 100.

In the energy storage device 002, the supplementary unit 200 needs to be connected with the switch control unit 400. In order to shorten the line path, the supplementary unit 200 may be located on a side, proximate to the switch control unit 400, of the cabinet body 100.

Alternatively, in practical application, the position of the supplementary unit 200 may be appropriately adjusted according to other requirements, which is not limited to the above embodiments.

The cabinet body 100 is provided with the cabinet door 101, and the cabinet door 101 is located on a side of the cabinet body 100. The relative positional relationship between the cabinet door 101 and the supplementary unit 200 is selected according to actual needs.

Specifically, the supplementary unit 200 may be arranged on a side, adjacent to the cabinet door 101, of the cabinet body 100, as described above, which can realize the back-to-back arrangement of the cabinet bodies 100. Alternatively, the supplementary unit 200 may be arranged on a side, away from the cabinet door 101, of the cabinet body 100, or the supplementary unit 200 may be arranged at a top of the cabinet body 100.

In the energy storage device 002, in order to facilitate the mounting of the supplementary unit 200, the supplementary unit 200 includes a fixed bracket 201 and a supplementary device 202. The fixed bracket 202 is fixed at the supplementary mounting position 102, and the supplementary device 202 is fixed to the fixed bracket 201.

In order to facilitate disassembly and maintenance, the fixed bracket 201 is detachably fixed at the supplementary mounting position 102, and/or, the supplementary device 202 is detachably fixed to the fixed bracket 201.

For example, the fixed bracket 201 is detachably fixed at the supplementary mounting position 102 by a threaded fastener, and the supplementary device 202 is detachably fixed to the fixed bracket 201 by a threaded fastener. In practical application, the detachable arrangement may be realized by other ways, which is not limited in this embodiment.

The specific structure of the fixed bracket 201 is selected according to actual needs, which is not limited in this embodiment.

The specific structure of the supplementary device 202 is selected according to actual needs. In an embodiment, the supplementary device includes a direct current/direct current converter, that is, a DC-DC converter. The DC-DC converter is in one-to-one correspondence with the battery cluster 300. If the number of the battery cluster 300 is at least two, the number of the DC-DC converter is at least two, that is, all the DC-DC converters are connected in parallel to the switch control unit 400.

In practical application, the supplementary unit may further include other device, which is not limited to the DC-DC converter.

Based on the energy storage device 002 according to the above embodiments, an energy storage power station 004 is further provided in an embodiment.

As shown in FIG. 5, the energy storage power station 004 includes: a power station energy storage converter 006, at least one power station energy storage cabinet 005, and the energy storage device 002 according to the above embodiments. The number of the energy storage device 002 is at least one, and the power station energy storage cabinet 005 and the at least one energy storage device 002 are connected in parallel to a power station energy storage converter 006.

It should be noted that, the power station energy storage cabinet 005 is an original energy storage cabinet of the energy storage power station 004, the power station energy storage converter 006 is an original energy storage converter of the energy storage power station 004, and the energy storage device 002 is a newly added supplementary cabinet of the energy storage power station 004, that is, the energy storage device 002 is configured to supplement electric power to the energy storage power station 004.

As shown in FIG. 5, the number of the energy storage device 002 is two, and the number of the power station energy storage cabinet 005 is four. In practical application, the number of the power station energy storage cabinet 005 and the number of the energy storage device 002 may also be appropriately adjusted, which are not limited in this embodiment.

Since the energy storage device 002 according to the above embodiments has the technical effects described above, and the energy storage power station 004 includes the energy storage device 002, the energy storage power station 004 also has corresponding technical effects, which are not repeated herein.

The above illustration of the disclosed embodiments enables those skilled in the art to implement or use the present application. Various modifications to these embodiments will be apparent to those skilled in the art, and the general principles defined herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. An energy storage device, comprising:
an energy storage cabinet; and
a supplementary unit; wherein
a supplementary mounting position is provided on an outer side of a cabinet body of the energy storage cabinet, and the supplementary unit is arranged outside the cabinet body and at the supplementary mounting position; and
the energy storage cabinet is operable separately, and the energy storage cabinet is operable in conjunction with the supplementary unit for the energy storage device to supplement electric power to an energy storage power station.

2. The energy storage device according to claim 1, wherein the energy storage cabinet comprises:
a battery cluster and a switch control unit which are arranged in the cabinet body; wherein
the switch control unit is configured to control the battery cluster to store energy and control the battery cluster to supplement electric power to the energy storage power station.

3. The energy storage device according to claim 2, wherein
in a case that the energy storage device is configured for energy storage, the battery cluster is connected with the switch control unit, and the switch control unit is configured to be connected with an energy storage converter; and
in a case that the energy storage device is configured to supplement electric power to the energy storage power station, the battery cluster, the supplementary unit and the switch control unit are connected in a listed sequence, and the switch control unit is configured to be connected with a power station energy storage converter.

4. The energy storage device according to claim 3, wherein the cabinet body is provided with a threading structure, and the threading structure is used for an output wire of the switch control unit to thread out of the cabinet body and for an input wire and an output wire of the supplementary unit to thread into the cabinet body.

5. The energy storage device according to claim 4, wherein the threading structure comprises two threading plates namely a first threading plate and a second threading plate;

in a case that the energy storage device is configured for energy storage, the first threading plate is detachably arranged on the cabinet body and is used for the output wire of the switch control unit to thread out of the cabinet body; and in a case that the energy storage device is configured to supplement electric power to the energy storage power station, the second threading plate is detachably arranged on the cabinet body, and is used for the output wire of the switch control unit to thread out of the cabinet body and for the input wire and the output wire of the supplementary unit to thread into the cabinet body;

or, the threading structure comprises a threading hole and a threading plate, the threading hole is used for the output wire of the switch control unit to thread out of the cabinet body, and the threading plate is used for the input wire and the output wire of the supplementary unit to thread into the cabinet body.

6. The energy storage device according to claim 5, wherein the supplementary mounting position and the threading plate are arranged on a same cabinet board of the cabinet body.

7. The energy storage device according to claim 2, wherein the supplementary unit is arranged on a side, proximate to the switch control unit, of the cabinet body.

8. The energy storage device according to claim 1, wherein the supplementary unit is arranged on a side, adjacent to a cabinet door, of the cabinet body; or, the supplementary unit is arranged on a side, away from a cabinet door, of the cabinet body; or, the supplementary unit is arranged at a top of the cabinet body.

9. The energy storage device according to claim 1, wherein the supplementary unit comprises a fixed bracket and a supplementary device, the fixed bracket is fixed at the supplementary mounting position, and the supplementary device is fixed to the fixed bracket.

10. The energy storage device according to claim 9, wherein the fixed bracket is detachably fixed at the supplementary mounting position, and/or, the supplementary device is detachably fixed to the fixed bracket.

11. The energy storage device according to claim 2, wherein the supplementary unit comprises a fixed bracket and a supplementary device, the fixed bracket is fixed at the supplementary mounting position, and the supplementary device is fixed to the fixed bracket.

12. The energy storage device according to claim 3, wherein the supplementary unit comprises a fixed bracket and a supplementary device, the fixed bracket is fixed at the supplementary mounting position, and the supplementary device is fixed to the fixed bracket.

13. The energy storage device according to claim 4, wherein the supplementary unit comprises a fixed bracket and a supplementary device, the fixed bracket is fixed at the supplementary mounting position, and the supplementary device is fixed to the fixed bracket.

14. An energy storage power station, comprising:
a power station energy storage converter; and
at least one power station energy storage cabinet, wherein the energy storage power station further comprises the energy storage device according to claim 1; wherein
the number of the energy storage device is at least one, and the power station energy storage cabinet and the at least one energy storage device are connected in parallel to the power station energy storage converter.

15. An energy storage power station, comprising:
a power station energy storage converter; and
at least one power station energy storage cabinet, wherein the energy storage power station further comprises the energy storage device according to claim 2; wherein
the number of the energy storage device is at least one, and the power station energy storage cabinet and the at least one energy storage device are connected in parallel to the power station energy storage converter.

16. An energy storage power station, comprising:
a power station energy storage converter; and
at least one power station energy storage cabinet, wherein the energy storage power station further comprises the energy storage device according to claim 3; wherein
the number of the energy storage device is at least one, and the power station energy storage cabinet and the at least one energy storage device are connected in parallel to the power station energy storage converter.

17. An energy storage power station, comprising:
a power station energy storage converter; and
at least one power station energy storage cabinet, wherein the energy storage power station further comprises the energy storage device according to claim 4; wherein
the number of the energy storage device is at least one, and the power station energy storage cabinet and the at least one energy storage device are connected in parallel to the power station energy storage converter.

* * * * *